Nov. 3, 1964   G. NISSENBAUM ETAL   3,155,091
DIAGNOSTIC DEVICE FOR THE DETECTION AND LOCATION OF
THE SITES OF INTERNAL ANATOMICAL ABNORMALITIES
Filed April 30, 1963
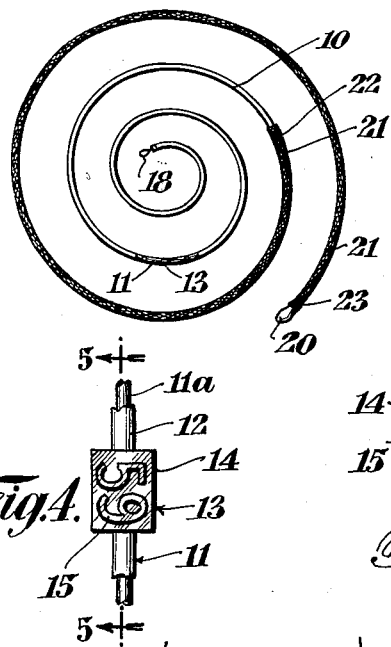
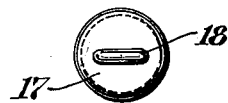
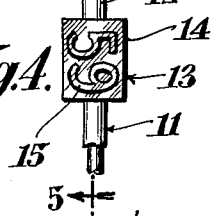
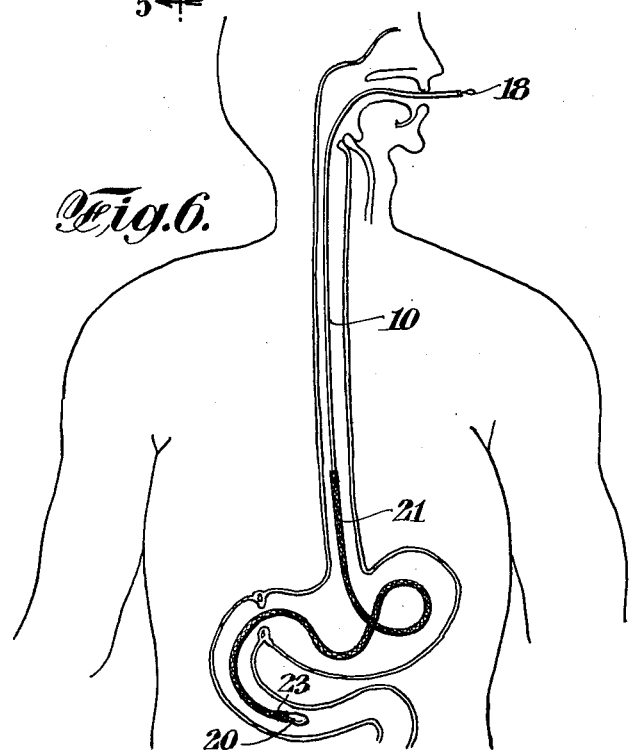
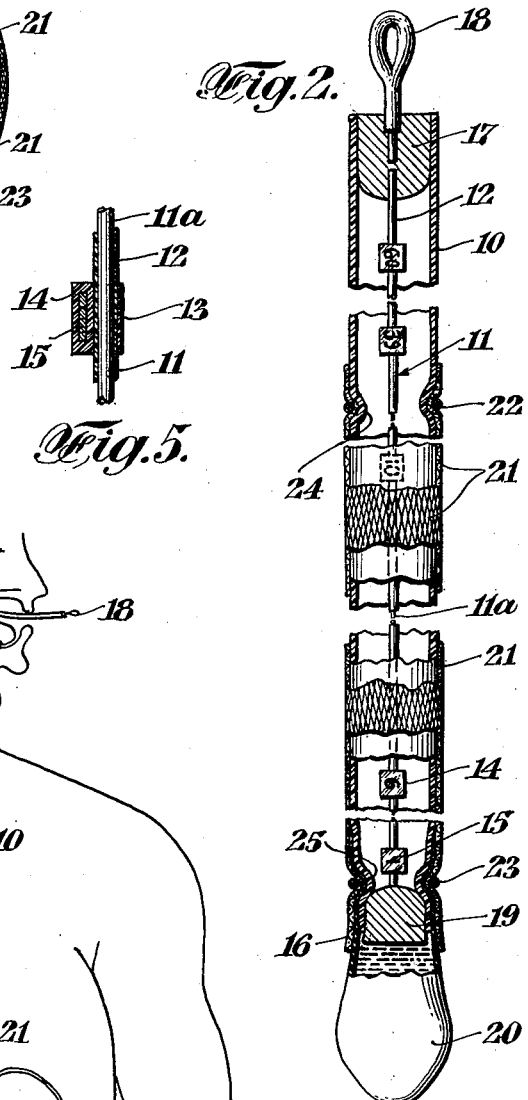
INVENTORS
GERALD NISSENBAUM
JONAH MAYERHOFF
BY
ATTORNEY

United States Patent Office 3,155,091
Patented Nov. 3, 1964

3,155,091
DIAGNOSTIC DEVICE FOR THE DETECTION
AND LOCATION OF THE SITES OF INTER-
NAL ANATOMICAL ABNORMALITIES
Gerald Nissenbaum, Jersey City, N.J., and Jonah Mayer-
hoff, New York, N.Y., assignors to Diagnosto Asso-
ciates, Ltd., New York, N.Y., a corporation of New
York
Filed Apr. 30, 1963, Ser. No. 276,966
8 Claims. (Cl. 128—2)

This invention relates to means for the location of anatomical areas for diagnostic study, and is particularly directed to a tubular member positionable in the digestive tract primarily for the diagnosis of gastrointestinal bleeding, but also adaptable for the recovery of diseased cells, such as exfoliated cancer cells, and the determination of their anatomical sites.

Heretofore diagnostic techniques for the location of upper gastrointestinal tract hemorrhages have involved the use of a radiopaque "string" swallowed by the patient, the taking of a roentgenogram of the abdomen, the injection into an antecubital vein of a "fluorescein" dye, removing the string and examining it under ultraviolet light. If the patient was bleeding actively at the time of the test, both blood and dye will be found on the tape, the dye appearing as a yellow spot of fluorescence under the ultraviolet light. This technique, while basically sound and scientifically correct, has not, however, always resulted in accurate diagnosis, in view of the inherent shortcomings of the strings heretofore employed. Among the problems encountered in the use of such strings were the difficulties in passing the strings through the intestinal tract, and in accurately locating the site of the anatomical abnormality from the indications on the string.

Among the objectives of our invention is the obviation of the aforesaid difficulties by the provision of a novel flexible tube that can easily traverse the gastrointestinal tract, that contains a sheath of material adapted to absorb blood or pick up other material such as exfoliated cells, and that contains dimensionally identifiable indicia to accurately indicate the exact anatomical site of the hemorrhage or other abnormality detected by the tube.

It is a further object of this invention to enable all but the relatively low-cost expendable outer sheath to be repeatedly used, in contradistinction to the costly practice of discarding the said conventional radiopaque strings after each use.

Other objects of our invention include the provisions of a tubular device of the above-described characteristics that can be safely used within a patient, that will not expose the internal organs to the danger of injury from sharp elements, that is completely sealed, that is non-toxic, that has no auto-fluorescence, and that can be readily fabricated at low cost.

Other objects, features and advantages will appear from the drawings and the description hereinafter given.

In the drawings:

FIG. 1 is a plan view of a diagnostic tube according to an embodiment of our invention, a fragment of the outer sheath being removed for clarity.

FIG. 2 is an enlarged fragmentary elevational and part-sectional view of the tubular member of FIG. 1.

FIG. 3 is a top view of FIG. 2.

FIG. 4 is an enlarged elevational view of a fragment of the plastic-coated wire cord and number-bearing member operatively positioned within the tube shown in the foregoing figures.

FIG. 5 is a section of FIG. 4 taken along line 5—5.

FIG. 6 is a semi-schematic view showing the device of our invention operatively positioned in the upper digestive tract of a person.

The particular embodiment of our invention illustrated comprises the tube 10 made of a smooth, soft and flexible preferably transparent non-toxic plastic material, such as vinyl, it being preferred that the tube be somewhat elastic for reasons that will hereinafter appear. Axially disposed within said tube is the radiopaque unstretchable wire cord 11, preferably made of a steel filament 11a having thereover a suitable plastic coating 12. Bonded to said coating are a plurality of markers 13 spaced apart at predetermined distances, each of said markers comprising, in the form of our invention shown in the drawings, a plastic block 14 carrying the position-indicator 15, the latter being a number made of lead or other radiopaque material. In the preferred embodiment illustrated, the said markers 13 are one inch apart and are consecutively arranged from the bottom up—the lowermost position-indicator 15 in the region of the bottom end 16 of the tube 10 bearing the number "1." The plastic material of block 14 is such as to readily bond with the said plastic coating 12.

The upper portion of the cord 11 is attached to the plug or sealing element 17 disposed within and in sealing engagement with the upper end of the tube 10, said member 17 carrying the outer hook member 18 for attachment to a safety cord or for convenient manual grasping. The bottom of the cord 11 is attached to the sealing plug 19. Operatively attached to the bottom of the tube is the weighted member 20, the particular form of our invention illustrated employing as the weighted member a mercury-containing bag of a type known to those skilled in the art. The member 20 is of such form as to be adapted for peristaltic gripping and of such weight as to gravitationally aid the tube to pass into and traverse the digestive tract. The length of the tube 10 is such that it will be fully extended when the cord 11 is in its fully extended length. Its elasticity will enable it to adjust itself to any variations which may develop in the relative length of the tube and cord due to temperature changes or other causes.

Positioned over and in firm engagement with the outer surface of a selected portion of the tube 10 is the absorbent sheath 21, it being preferred that this sheath be made of a woven or knitted fabric of highly absorbent unbleached cotton. Once the sheath is operatively positioned on the tube, it is fixedly maintained in such position by any suitable fasteners, such as the elastic bands 22 and 23, the yielding nature of the tube material enabling it to be compressed at the respective regions 24 and 25, whereby the bands and the sheath 21 are maintained in fixed relation to the tube.

In the operative use of this instrument, the sheath is wetted against the tube and lubricated with water soluble lubricant jelly, and then the device is introduced into the mouth of the patient and swallowed by him. The smoothness, flexibility and the other aforesaid physical characteristics of the tube are such as to enable the device to be easily swallowed, it being readily adapted to accommodate itself to peristaltic gripping. After it has traversed the esophagus, stomach and duodenum, a "scout" X-ray film is taken of the esophagus and abdomen in the supine anterior-posterior position and lateral decubitus positions to observe and identify the location of the radiopaque numbers 15 anatomically. A fluorescent dye, such as fluorescein—known to those skilled in the art—is then injected by vein, in the manner aforesaid. After the lapse of a predetermined period of time, which may be 2 or 3 minutes, the device is removed. If the diagnosis is for hemorrhaging, the sheath 21 is inspected for bleeding first by ordinary light and then for fluorescence by ultraviolet light or other suitable light. Active bleeding will, in the manner above mentioned, be readily indicated by distinctive coloring at the blood-stained areas under ultraviolet light exposure—negative results under such exposure indicating bleeding only in the past.

The areas of fluorescence and blood-absorbed areas are noted with respect to the number indications on the markers 13. These numbers either can be seen through the tube 10 if it is transparent and through the sheath 21 if it is thin or loosely woven or knitted—or can be determined by measuring the number of inches from the bottom of the tube, where the first marker is "1," to the indicated areas on the sheath, the number of inches measured being the number on the marker at the indicated area. This number or numbers can be readily correlated with the anatomical areas indicated by the corresponding numbers of said markers visible on the X-ray film that was taken when the apparatus was operatively in place within the body. In this manner the exact location of the hemorrhaging areas can readily be located with utmost accuracy. The subsequent testing of the cotton sheath is then performed by known methods.

If the diagnosis is in the field of exfoliative cancer cytology, the sheath, when operatively in place along the area of suspected carcinoma, with recover some adjacent exfoliated cells. When the device is thereafter removed, after scout X-ray or other necessary procedures are performed, the identified sections are cut from the sheath, washed in saline, and the saline suspended cells thereafter processed by standard exfoliative cytology techniques.

After each diagnosis, the sheath is removed, the instrument sterilized, and a new sheath slipped over the tube 10, whereafter the device is ready for another diagnostic use.

We have found our instrument of great diagnostic value, especially in patients with a history of upper gastrointestinal hemorrhage where differential diagnosis is desired between esophageal varices and peptic ulcer, in patients with positive stool guaiacs, in cases of subtotal gastrectomies with anemia, and in patients with cancer of the upper gastrointestinal tract and anemia.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

We claim:

1. A diagnostic device for the detection and location of the sites of internal anatomical abnormalities, comprising a tube proportioned to enable it to be swallowed for positioning within the gastrointestinal tract, said tube being of flexible non-toxic radio-transparent material, a filament disposed within said tube, a plurality of position-indicators of radiopaque material carried by said filament and spaced apart predetermined distances, and a sheath of absorbent material removably positioned over said tube and enveloping a selected portion thereof.

2. A diagnostic device according to claim 1, said filament being of substantially non-stretchable material, said tube being of predetermined elastic properties.

3. A diagnostic device for the detection and location of the sites of internal anatomical abnormalities, comprising a tube proportioned to enable it to be swallowed for positioning within the gastrointestinal tract, said tube being of flexible non-toxic radio-transparent material with a smooth outer surface, said tube being closed at the upper and lower terminals thereof, a filament disposed within said tube and having thereover a coating of selected plastic material, a plurality of plastic blocks bonded to said plastic coating, each of said blocks having embedded therein a position-indicator of radiopaque material, said blocks being spaced apart predetermined distances, a sheath of absorbent material removably positioned over said smooth outer surface of said tube and enveloping a selected portion of said tube, and a weighted member attached to the bottom end of said tube.

4. A diagnostic device according to claim 1, said absorbent sheath being made in firm pressing engagement with said outer surface of the tube.

5. A diagnostic device for the detection and location of the sites of internal anatomical abnormalities, comprising a tube proportioned to enable it to be swallowed for positioning within the gastrointestinal tract, said tube being of flexible non-toxic radio-transparent material, a filament disposed within said tube, a plurality of position-indicators of radiopaque material carried by said filament and spaced apart predetermined distances, and a sheath of absorbent material removably positioned over said tube and enveloping a selected portion thereof, said tube being of soft and pliant material, and securing means at the upper and lower ends of said sheath tightly enveloping the adjacent portions of the sheath and indenting the adjacent portions of the tube, thereby to hold the sheath fixedly secured to the tube.

6. A diagnostic device according to claim 5, said sheath being made of unbleached cotton.

7. A diagnostic device according to claim 1, said tube having at the said upper and lower terminals thereof sealing plugs, the upper and lower ends of said filament being attached to said respective plugs.

8. A diagnostic device for the detection and location of the sites of internal anatomical abnormalities, comprising a tube proportioned to enable it to be swallowed for positioning within the gastrointestinal tract, a plurality of position-indicators of radiopaque material carried by said tube and spaced apart predetermined distances, and a sheath of absorbent material removably positioned over said tube and enveloping a selected portion thereof.

References Cited in the file of this patent

UNITED STATES PATENTS

| | | |
|---|---|---|
| 2,949,910 | Brown | Aug. 23, 1960 |
| 2,955,591 | MacLean | Oct. 11, 1960 |
| 3,060,972 | Sheldon | Oct. 30, 1962 |
| 3,097,636 | Haynes | July 16, 1963 |